Patented Oct. 24, 1950

2,527,380

UNITED STATES PATENT OFFICE 2,527,380

HETEROCYCLIC BENZANTHRONE COMPOUNDS

Wilhelm Schmidt-Nickels, Little York, N. J., assignor to General Aniline & Film Corporation, New York, N. Y., a corporation of Delaware No Drawing. Application October 21, 1949,
Serial No. 122,864

3 Claims. (Cl. 260—309)

This invention relates to new heterocyclic benzanthrone compounds.

The compounds of my invention are benzanthrone-6,7-C-phenyliminazole and the monobromo derivative thereof carrying the bromine atom in the Bz 1-position. They have the probable general formula:

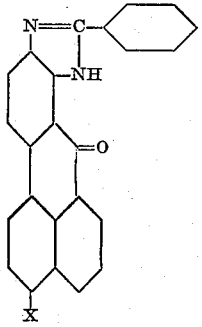

wherein X is hydrogen or bromine. The new heterocyclic benzanthrone compounds are useful as intermediates for the formation of vat dyestuffs.

The benzanthroneiminazole compounds are prepared by the action of iron and glycerine in strong sulfuric acid on anthraquinone-1,2-C-phenyliminazole.

The monobromo derivative is prepared by the direct bromination of the benzanthroneiminazole compounds in nitrobenzene to which is added a proportion of bromine calculated to introduce but one atom of bromine into the molecule of the starting compound, and a small amount of iodine to promote the bromination. The bromination is carried out by stirring the reaction mixture at a temperature of 155 to 160° C. for 3 hours. The reaction mixture is allowed to cool to room temperature, further cooled to 15° C., whereupon the bromination product is filtered, washed with a little nitrobenzene, benzene and dried.

The preparation of my new heterocyclic benzanthrone compounds is illustrated in a more specific manner in the following examples. Parts are by weight and both parts and volumes are in the metric system.

Example 1

744 parts conc. sulfuric acid (96%) and 89.2 parts anthraquinone-1,2-C-phenyliminazole is stirred at room temperature for 1 hour. After application of a cooling bath to keep the temperature below 30° C., 32.4 parts water is dropped into the solution. The amount of water is calculated to lower the concentration of $H_2SO_4$ to 92%. The charge is heated to 115° C. Then at 115–120° C., there is gradually added during 2 hours a mixture of 75.8 parts glycerol and 77.0 parts iron borings. After all is introduced the charge is stirred at 115–120° C. for 4 hours. The reaction product is poured into water, filtered out and washed with water. The cake is charged into 2150 parts water and 715 parts by volume hydrochloric acid (35%). After refluxing overnight to dissolve the iron, the material is filtered, washed with water until neutral and dried. Product obtained=72.0 parts.

The analysis of a vacuum sublimed sample gave the following results:

Found: C=83.28%, H=4.30%, N=8.09%.
Theory for $C_{24}H_{14}ON_2$: C=83.24%, H=4.05%, N=8.09%.

Example 2

A charge of 100 parts by volume of nitrobenzene, 6.9 parts benzanthrone-6,7-C-phenyliminazole, prepared as described in Example 1, and 0.5 part iodine is heated to 155–160° C. At this temperature a solution of 4 parts bromine in 30 parts by volume nitrobenzene is added gradually during 3 hours. After the addition is completed the charge is stirred at 155–160° C. for 5 hours and then cooled to 15° C. at which temperature the bromination product is filtered, washed with a little nitrobenzene, benzene and dried. Product obtained=7.5 parts.

Found: Br=20.12%.
Theory for $C_{24}H_{13}OBrN_2$: Br=18.82%.

This application is a continuation-in-part of my application Serial No. 68,728, filed December 31, 1948, now abandoned.

I claim:

1. A heterocyclic benzanthrone compound of the general formula:

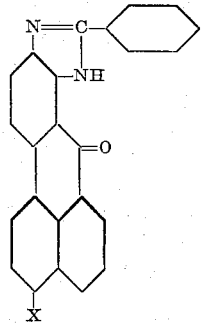

wherein X is selected from the group consisting of hydrogen and bromine.

2. Benzanthrone-6,7-C-phenyliminazole.

3. Bz 1-brombenzanthrone-6,7-C-phenyliminazole.

WILHELM SCHMIDT-NICKELS.

No references cited.